(12) United States Patent
Biers et al.

(10) Patent No.: US 9,909,935 B1
(45) Date of Patent: Mar. 6, 2018

(54) CALIBRATION AND CONTROL SYSTEM FOR A CLIMATE SYSTEM UTILIZING CLOSED LOOP FEEDBACK AND A PHASE CHANGE CELL

(71) Applicant: Harris Corporation, Melbourne, FL (US)

(72) Inventors: Michael Terry Biers, Fort Wayne, IN (US); Joseph David Bender, Albion, IN (US); Rachele Barbara Cocks, Columbia City, IN (US); Dominick Samuel Lee, Fort Wayne, IN (US); John Russell Holder, Fort Wayne, IN (US)

(73) Assignee: Harris Corporation, Melbourne, FL (US)

( * ) Notice: Subject to any disclaimer, the term of this patent is extended or adjusted under 35 U.S.C. 154(b) by 245 days.

(21) Appl. No.: 15/016,643

(22) Filed: Feb. 5, 2016

(51) Int. Cl.
*G01K 15/00* (2006.01)
*F28F 13/00* (2006.01)

(52) U.S. Cl.
CPC ............ *G01K 15/005* (2013.01); *F28F 13/00* (2013.01)

(58) Field of Classification Search
CPC ...... G01K 3/005; G01K 11/06; G01K 15/002; G01K 15/005
See application file for complete search history.

(56) References Cited

U.S. PATENT DOCUMENTS

| 4,244,207 | A | * | 1/1981 | Staunton ................ G01K 15/00 374/3 |
| 4,627,740 | A |   | 12/1986 | Jerde et al. |
| 5,115,859 | A | * | 5/1992 | Roebelen, Jr. ..... A41D 13/0053 165/10 |
| 6,447,160 | B1 |   | 9/2002 | Fraden |
| 7,159,824 | B2 |   | 1/2007 | Geyer et al. |
| 7,795,605 | B2 |   | 9/2010 | Habib et al. |
| 8,114,686 | B2 |   | 2/2012 | Habib et al. |
| 8,657,487 | B2 |   | 2/2014 | Bingham et al. |

(Continued)

OTHER PUBLICATIONS

Gero et al (A Blackbody Design for SI-Traceable Radiometry for Earth Observation, Journal of Atmospheric and Oceanic Technology, vol. 25, Nov. 2008, pp. 2046-2054, DOI: 10.1175/2008JTECHA1100.1).*

(Continued)

*Primary Examiner* — Clayton E Laballe
*Assistant Examiner* — Leon W Rhodes, Jr.
(74) *Attorney, Agent, or Firm* — Edell, Shapiro & Finnan, LLC

(57) ABSTRACT

A calibration system for a climate system utilizing closed loop feedback and a phase change cell includes controlling a transfer rate of energy between a phase change cell and a thermal mass based on at least a temperature of the thermal mass. The transfer rate is controlled in order to control the temperature of the thermal mass and selectively move a material in the phase change cell through a phase change with transferred energy. In particular, the temperature of the thermal mass is controllable when the material is maintained in the phase change. A thermal sensor in the thermal mass may also be calibrated based on the temperature of a thermal sensor in the phase change cell during a predetermined portion of the phase change.

23 Claims, 8 Drawing Sheets

(56) References Cited

U.S. PATENT DOCUMENTS

2010/0042356 A1    2/2010  Kjoller et al.
2013/0229864 A1    9/2013  Conte et al.

OTHER PUBLICATIONS

MOTR fact sheet ("Miniature Orbital Temperature References", SDL/11-248D, <http://www.sdl.usu.edu/downloads/motr.pdf>, available Oct. 30, 2015).*

Best, F.A., et al., "On-Orbit Absolute Temperature Calibration Using Multiple Phase Change Materials—Overview of Recent Technology Advancements," Proc. of SPIE, vol. 7857, pp. 1-10 (2010).

Bingham, G.E., et al., "Re Calibration of Temperature Sensors Using Phase-Change Cells," Eos Trans. AGU, 89(53), Fall Meeting in San Fransisco, Suppl., Abstract GC23A-0754 (2008).

* cited by examiner

| GOAL TEMPERATURE | DESCRIPTION |
|---|---|
| -5 | DRIVE TO FREEZE POINT OF ALL MATERIALS |
| 15 | DRIVE TO STABILITY POINT BEFORE MELT TEMPERATURE GOAL |
| 17 | DRIVE TO MELT POINT OF FIRST MATERIAL |
| 20 | DRIVE TO STABILITY POINT BEFORE MELT TEMPERATURE GOAL |
| 21 | DRIVE TO MELT POINT OF SECOND MATERIAL |
| 28 | DRIVE TO STABILITY POINT BEFORE MELT TEMPERATURE GOAL |
| 30 | DRIVE TO MELT POINT OF THIRD MATERIAL |
| 31 | DRIVE TO FINAL GOAL TEMPERATURE |

FIG.3

CALIBRATION AND CONTROL SYSTEM FOR A CLIMATE SYSTEM UTILIZING CLOSED LOOP FEEDBACK AND A PHASE CHANGE CELL

FIELD OF THE INVENTION

The present invention is directed to climate systems and, in particular, to controlling and calibrating components of a climate system utilizing a phase change cell based on closed loop feedback.

BACKGROUND OF THE INVENTION

Climate systems and, in particular, space-based climate systems utilizing optical instruments, must be periodically calibrated in order to provide accurate data. Depending on the configuration and type of instrument, some instruments may need to be calibrated more frequently than others. However, without regular calibration, nearly all instruments are subject to drift that may impact the accuracy of the instrument. For example, instruments, especially spaced-based instruments, using temperature sensors must be frequently calibrated in order to prevent temperature drift. Moreover, various climate systems require certain components to be maintained and/or moved towards certain temperatures. Accordingly, temperature systems must be accurate in order to allow the components to be properly controlled.

In order to calibrate temperature sensors, temperature readings provided by the temperature sensors may be compared to a temperature of a phase change material during a phase change, since materials change phases at known temperatures. However, typically, calibration systems are open-loop systems that simply calibrate a sensor based on the phase change without ensuring stability in the calibration system or providing control over the temperature of various components in the calibration system.

SUMMARY OF THE INVENTION

Techniques are provided herein for a calibration and control system for a climate system. The techniques utilize closed loop feedback and a phase change cell in order to provide the calibration and control. These techniques may be embodied as a method, a system, an apparatus, and instructions in a computer-readable storage media to perform the method.

According to at least one example embodiment, a calibration system for a climate system includes a phase change cell, a thermal mass, a heat transfer device, and a processor. The phase change cell includes an enclosure, a material sealed within the enclosure, and a first thermal sensor configured to measure a temperature of the material. The thermal mass includes at least one second thermal sensor configured to measure a temperature of the thermal mass. The heat transfer device is in thermal communication with the phase change cell and the thermal mass and is configured to transfer energy between the phase change cell and the thermal mass at a transfer rate. The processor is configured to control the transfer rate based on at least the temperature of the thermal mass in order to control the temperature of the thermal mass and selectively move the material through a phase change with transferred energy. In particular, the temperature of the thermal mass is controllable when the material is maintained in the phase change. The processor is also configured to calibrate the second thermal sensor based on the temperature of the first thermal sensor during a predetermined portion of the phase change.

BRIEF DESCRIPTION OF THE DRAWINGS

FIG. 3 illustrates a goal temperature table that may be utilized to select goal temperatures for phase change materials included in the system, according to the present invention.

Like reference numerals have been used to identify like elements throughout this disclosure.

DETAILED DESCRIPTION OF THE INVENTION

Presented herein are techniques for calibrating and controlling climate systems based on closed loop feedback from a phase change cell. Generally, calibrating a climate system in accordance with the techniques provided herein calibrates a thermal sensor included in the climate system based on known phase change points of phase change materials. Calibrating a thermal sensor in this manner serves to monitor and adjust (e.g., control) a thermal mass (e.g., an Internal Calibration Target (ICT) on orbit), over the operational lifetime of a climate system in which the thermal mass is incorporated. Meanwhile, controlling a climate system in accordance with the techniques presented herein generally includes controlling the state of phase change materials and the temperature of various components included in the climate system based on various inputs from the calibrated thermal sensors included in the system. Calibrating and controlling a climate system in this manner allows a thermal mass to be maintained at a known temperature and serve as a known calibration constant for the climate system.

In order to provide thermal control over a thermal mass, techniques herein provide advanced thermal control of a heat transfer device (e.g., a thermoelectric cooler) included in the system while allowing valuable information to be extracted from various components in the system. For example, techniques provided herein control an amount of energy that is delivered to a phase change material, thereby controlling the duration and timing of the phase change process of the phase change material. Moreover, techniques presented herein characterize the relevant thermal characteristics of the system and create drive characteristic curves to control thermal response of the system through various heat transfer device settings corresponding to boundary temperatures. These control techniques enable a full system control approach and have some degree of interaction with the calibration techniques. As an example, the techniques for calibrating thermal sensors and the techniques for controlling the temperature of the phase change material are used together in order to achieve a phase change duration time that satisfies various calibration certainty requirements.

Figure 1:
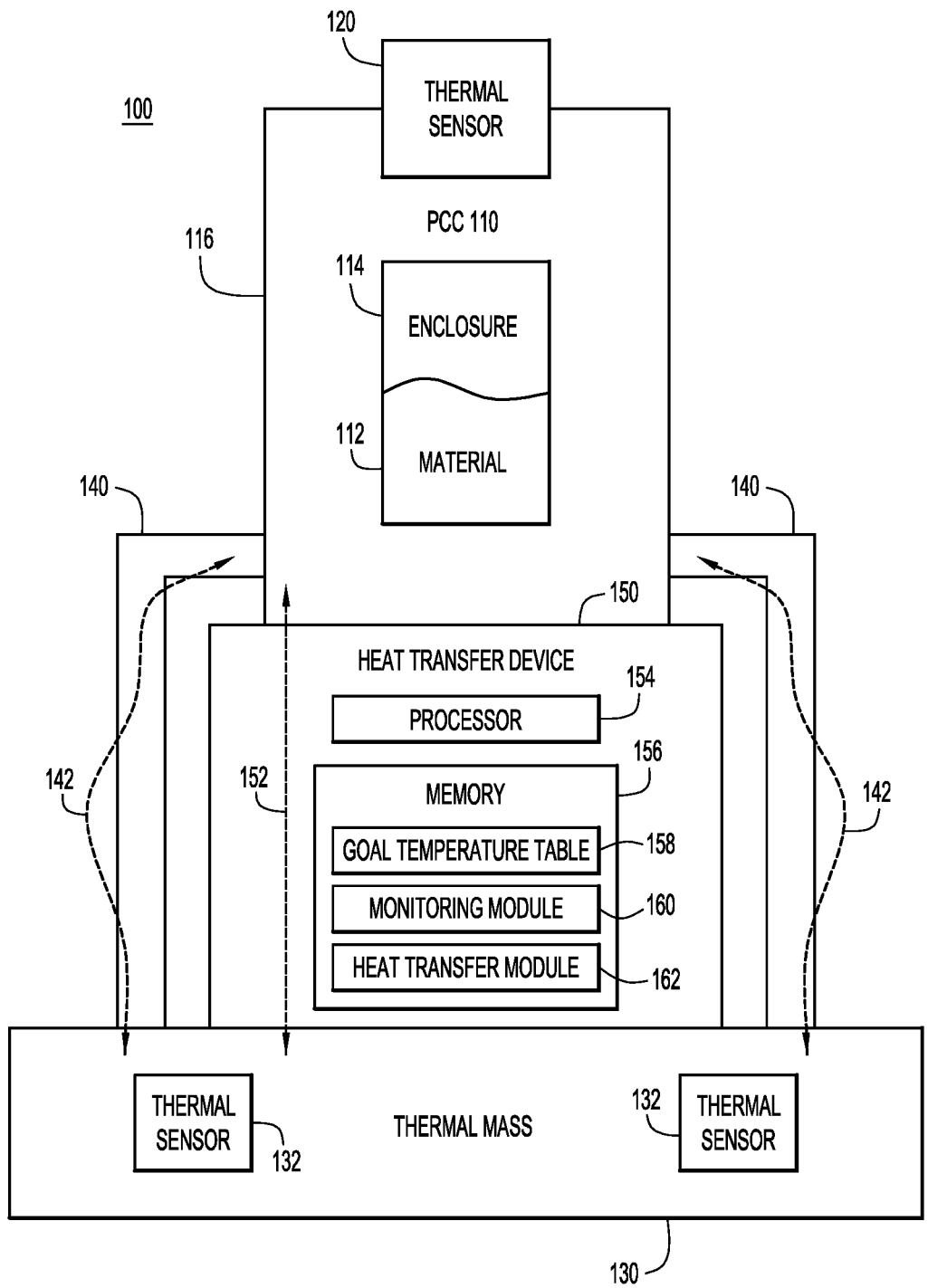
FIG. 1 shows a front perspective view of an example embodiment of a calibration and control system for a climate system according to the present invention.

Now referring to FIG. 1, a calibration and control system 100 formed in accordance with the techniques disclosed herein includes a phase change cell (PCC) 110 that includes at least one phase change material 112 that is sealed within an enclosure 114. Although only one enclosure 114 is shown in FIG. 1, each phase change material 112 included in the system 100 has a specified phase change (e.g., melt) point that is a known constant and, thus, each phase change material 112 may be sealed within its own enclosure 114. Each of the enclosures 114 may be housed within a PCC housing 116.

For example, the phase change cell 110 may include three materials: a first material with a melt (e.g., solid to liquid transition) point at 17° C.; a second material with a melt point at 21° C.; and a third material with a melt point at 30° C. In at least some embodiments, each enclosure 114 is a stainless steel or other type of metallic enclosure with caps (not shown) and is configured to provide a controlled volume and pressure environment, such that each of the at least one phase change material 112 can be sealed within a controlled volume and pressure environment. The PCC 110 also includes one or more thermal sensor 120 embedded throughout the PCC 110. For example, in some embodiments, thermal sensors 120 may be embedded at the surfaces of the PCC housing 116 (e.g., adjacent a heat transfer device 150) and/or in each enclosure 114 included in the PCC 110. Consequently, the thermal sensors are configured to measure or determine the temperature of the phase change materials 112 and the external surfaces of the PCC 110.

In at least some embodiments, the one or more thermal sensor 120 includes one or more thermistors imbedded in proximity to the phase change materials 112 and in proximity to the surface of the PCC 110. In these embodiments, the temperatures of the phase change materials 112 may be determined by converting the resistance readings from the thermistor(s) using the Steinhart-Hart equations. However, in other embodiments, the one or more thermal sensor 120 may include thermistors, platinum resistance thermometers (PRTs), thermocouples, temperature measuring diodes, or any combination thereof.

The PCC 110 is mounted to a thermal mass 130 via a mounting 140. The thermal mass 130 may have one or more thermal sensors 132, such as PRTs, embedded across the thermal mass 130 and configured to measure or determine temperature across the thermal mass 130. In some embodiments, the thermal mass 130 is a blackbody. Consequently, if the temperature of the thermal mass 130 is known and constant across the thermal mass 130, the blackbody may radiate energy at a known wavelength. Then, this wavelength may be utilized to calibrate an optical component, which must be precisely calibrated in order to function appropriately. However, in other embodiments, the thermal mass 130 may be a laser of a certain solid state laser wavelength.

The calibration system 100 also includes a heat transfer device 150, such as a thermoelectric cooler (TEC), disposed between and in contact with the housing 116 of the PCC 110 and the thermal mass 130. The heat transfer device 150 is also disposed within, between, or otherwise adjacent to the mounting 140. For example, in the depicted embodiment, the heat transfer device 150 is disposed between two portions of the mounting 140. Although only one heat transfer device 150 is shown in FIG. 1, in some embodiments, the heat transfer device 150 may include multiple devices, such as multiple TECs, configured to be controlled as a single heat transfer device. The heat transfer device 150 provides a first thermal path 152 between the thermal mass 130 and the PCC 110 and includes a processor 154 configured to monitor and control thermal energy transfer across thermal path 152. By comparison, the mounting structure 140 provides an uncontrolled alternative thermal path 142. However, in some embodiments, the mounting structure may include a thermal sensor to allow the mounting 140 (and, thus, the thermal path 142) to at least be monitored.

Since the uncontrolled thermal paths 142 are passive and have an unknown thermal conductivity, the amount of heat leaked through the paths 142 depends on the temperature of the system and the rate of heat exchange, making the calibration system 100 more complex and necessitating constant feedback in order to properly control the heat path 152 to control the transfer of thermal energy within system 100. For example, heat transfer device may increase or reduce the amount of thermal energy passing between the PCC 110 and thermal mass 130 via thermal path 152 (e.g., with heating or cooling produced by the heat transfer device 150) based on monitored temperatures of the PCC 110 and thermal mass 130. In some embodiments, the heat transfer device is also used as a third temperature sensor (in addition to thermal sensors 120 and 132) by measuring the energy (voltage when the heat transfer device 150 is a TEC) across the heat transfer device resulting from the temperature gradient between the PCC 110 and the thermal mass 130. Moreover, in some embodiments, such as embodiments where the heat transfer device is a TEC, the heat transfer device 150 may generate a current or voltage based on an applied thermal differential.

The manner in which the processor 154 controls the heat transfer across path 152 is described in further detail below; however, generally, the heat transfer device 150 includes a processor 154 and a memory 156 with various tables or modules that may executed by the processor 154 in order to perform tasks associated with calibrating and controlling components in system 100. In particular, memory 156 includes a goal temperature table 158 that includes goal temperatures for the PCC 110 and/or thermal mass 130, a monitoring module 160 that may be configured to constantly monitor the temperature of the PCC 110, the thermal mass 130, any thermal sensors included in system 100, or any other components included in the system 100. The monitoring module 160 may also monitor the system for stability in some embodiments. Moreover, in at least some embodiments, the monitoring module 160 may monitor and/or determine the state of the phase change materials 112 (e.g. system state knowledge). The memory 156 may also include a heat transfer module 162 which may be configured to control the heat transfer device 150 in order to control the rate at which thermal energy is transferred between the thermal mass 130 and the PCC 110 via thermal path 152. As is described in more detail below, the heat transfer module 162 controls this rate based on inputs from the monitoring module 160, such as the system state knowledge, and the heat transfer module 162 may provide different rates based on the various inputs (e.g., the state of the phase change materials 112).

Although each module described herein, such as the monitoring module 160 and the heat transfer module 162, is shown stored in memory 156, each module described herein, may be hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by processor 154 can also refer to logic based processing by the module that is initiated directly or indirectly by the processor 154 to complete a process or obtain a result. Alternatively or additionally, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each unit may include only memory storing instructions executable with the processor 154 to implement the features of the corresponding module without the module including any other hardware.

The memory 156 may also be configured to store any data relating to phase change points, data extracted from thermal sensors 120, 132, instructions related to phase change points or system stability, or any other data. Generally, memory 156 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 156 may be or include one or more tangible (non-transitory) computer readable storage media (e.g., a memory device) encoded with software comprising computer executable instructions. For example, memory 156 may store instructions that may be executed by processor 154 for controlling the heat transfer rate via thermal path 152, as is described below with reference to the Figures. In other words, memory 156 may include instructions, that when executed by one or more processors, cause the one or more processors to carry out the operations described below in connection with the Figures.

Figure 2:
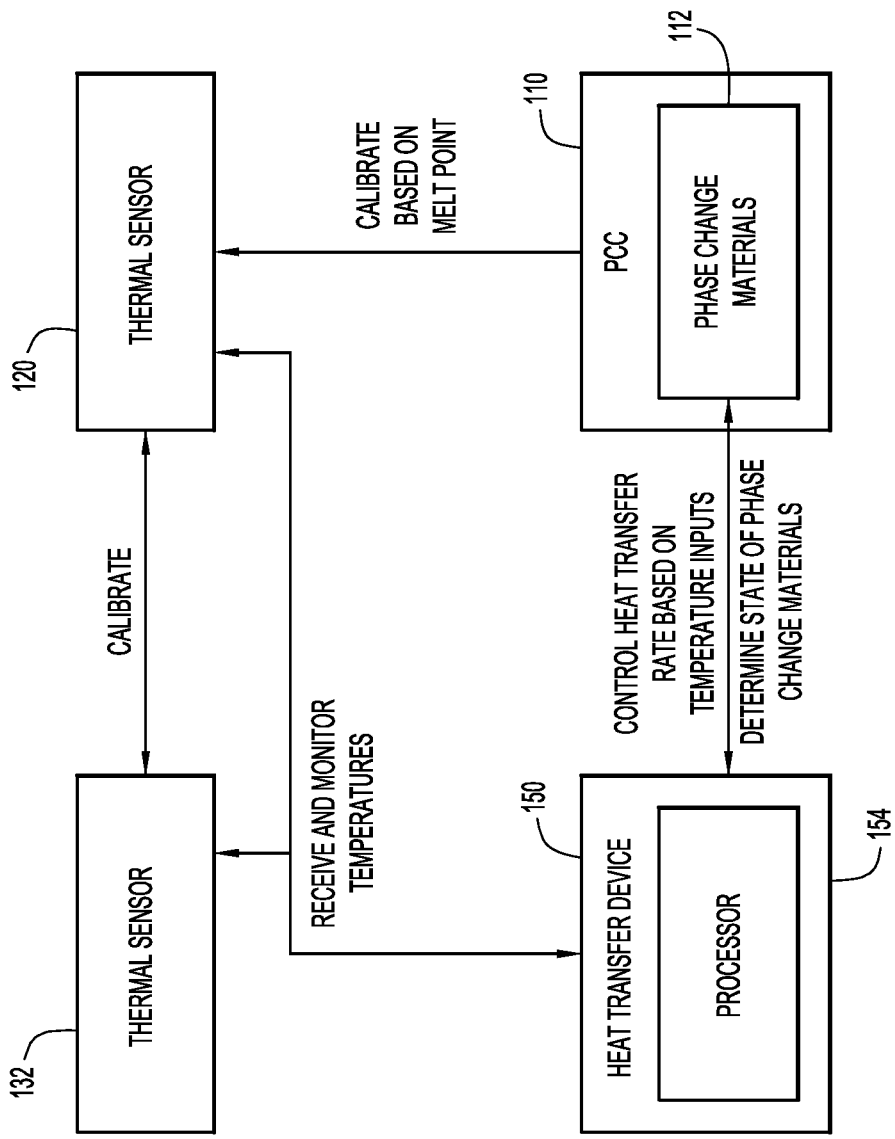
FIG. 2 is a high-level block diagram of an example closed feedback loop utilized by the present invention to control and calibrate a climate system, according to the present invention.

Now referring to FIG. 2, block diagram 200 depicts a high-level overview of the feedback loop used to control, monitor, and/or calibrate the components shown in FIG. 1. Generally, phase change points extracted from data are returned through telemetry, and the responses of the PCC 110 and thermal mass 130 are tracked by monitoring thermal sensors (e.g., thermal sensors 120 and 132) imbedded therein in order to determine thermal resistance variation in the system. Then, any sensors can be calibrated if drift is detected and the rate of heat transfer to the PCC 110 can be controlled to ensure phase change occurs at desired times and durations.

More specifically, in at least some embodiments, temperatures from or determined by readings taken by thermal sensor 120 and thermal sensor 132 are relayed to the heat transfer device 150 which, based on these inputs, may dynamically control a rate at which thermal energy is transferred to the phase change materials 112 in the PCC 110. Additionally or alternatively, the heat transfer device 150 may determine the state of the phase change materials (e.g., liquid, gas, phase transition, etc.) and adjust or dynamically control the rate accordingly. For example, in some embodiments, a specific cycle or segment of a cycle may be selected based on the system state knowledge (e.g., drive to a phase change temperature of a certain phase change material included in the phase change material 112) and the specific heat transfer rate applied in that segment may be determined based on the determined temperature differential.

In embodiments where the heat transfer device 150 is a TEC, the heat may be transferred at a time dependent rate by applying a time dependent current or voltage across the TEC. By controlling the heat transfer rate, the heat transfer device 150 may control when the phase change materials 112 are moved through and/or held in a phase change. When the phase change materials 112 are in the phase change, thermal sensors 120 (the thermal sensor(s) on the PCC 110) and thermal sensors 132 (the thermal sensor(s) on the thermal mass 130) may be calibrated since the phase change material 112 changes phase at a known temperature. Once calibrated, thermal sensors 120 and 132 may continue to provide temperature inputs to the heat transfer device 150 in order to enable cyclical heating/cooling of the phase change materials 112 and to move the phase change materials 112 and/or the thermal mass 130 towards various goal temperatures (e.g., from the goal temperature table 158) in any desirable sequence or cycle (e.g. steps from a goal table may be repeated or executed in any order if desired). Additionally or alternatively, the temperature inputs may be used to hold the phase change materials 112 and/or the thermal mass 130 at a constant temperature.

In order to ensure accuracy during the processes depicted in FIG. 2, all variables measured in the calibration system 100 (e.g. the temperatures measured or determined by thermal sensors 120 and 132) are stored and processed in double precision. The ability to control the energy transfer from the heat transfer device 150 depends on the ability to accurately target a goal temperature which, in turn, depends on accurately measuring the temperature of the PCC 110 and thermal mass 130. Consequently, ensuring accurate variable measurements (e.g., temperature inputs) is quite important.

Now referring to FIG. 3, table 300 illustrates an example goal temperature table 300 that is an example of goal temperature table 158 from FIG. 1. The goal table 300 includes a predefined set of goal temperatures for any phase change materials 112 included in the PCC 110. In particular, the goal temperatures correspond to the temperatures required to pass the materials included in the phase change materials 112 through a phase change process, such as a melting process. However, in other embodiments, the goal temperatures may also be a function of the temperature of the thermal mass 130 (e.g., temperatures that will drive the thermal mass 130 to certain temperatures). The goal table may be defined through test for each flight configuration as the sequence and set points will depend on the system 100's construction.

In some embodiments, the phase change materials 112 are driven (e.g., moved) through the temperatures included in the goal temperature table 300 and each time through the goal temperature table 300 may be referred to as a cycle. A full cycle may include a temperature goal to freeze (or condense, solidify, or otherwise move to a specific phase) all of the phase change materials and temperature goals to phase change (e.g., melt) each material. Moreover, a full cycle may include a preconditioning cycle on each of the materials to prevent a super cooling condition in which the materials freeze at a point sufficiently below a typical freezing point. The preconditioning sequence may involve quickly bringing the system to a goal temperature set to phase change a material, and once the goal is reached, cooling back down to the material's freeze point. After this process, the temperature goal approach can be reinitiated in order to go through and save data from the phase change. This allows for the phase change to be repeatable and to be controlled for sufficient durations. However, in operation, the system 100 may not always move through the goal temperature table sequentially. For example, in some embodiments, the system 100 may repeat and/or re-order segments of the cycle, perhaps based on the system state knowledge of the phase change materials 112. As a specific example, in some embodiments, the system 100 may continually melt and refreeze a first phase change material without driving to any other temperatures in the goal temperature table 300.

The goal temperatures may be determined via testing and desired operation of the system 100 (e.g., desired cycles). For example, for a system 100 including a PCC 110 with three phase change materials 112, the goal temperature table may include a goal temperature for freezing all the materials, one goal temperature approaching a melt point for each material included in the phase change materials 112, and one goal temperature for melting each material. An end goal temperature may also be set indicating the end of the specified cycle.

In the specific example depicted in FIG. 3, the goal temperature table 300 includes eight goal temperatures for a PCC 110 with three phase change materials 112. The first goal temperature 302 is −5° C., which will freeze all of the materials 112. The second goal temperature 304 is a stability point of 15° C., which ensures the system is stable before any materials are moved through a phase change, thereby increasing the likelihood of the materials 112 each being steadily and stably moved through a phase change. Subsequent to the second goal temperature 304, the third goal temperature 306 moves the first material included in the phase change materials 112 through a phase change, such as a melt. Once this phase change is determined to be complete, the system 100 can cycle to stability and phase change temperatures for the second and third materials included in the phase change materials 112 at goal temperatures 308, 310, 312, and 314.

The final temperature 316 in the goal table 300 is a precautionary step and drives the system to a point higher than the final phase change goal temperature 314. This final temperature may be defined with a flight hardware characterization test and should be greater than the sum of the final goal temperature, a thermal equivalent of the maximum boost that may applied to the system, and the thermal equivalent of an upper limit of uncertainty in system due to end of life conditions, each of which are described in further detail below.

Figure 4A:
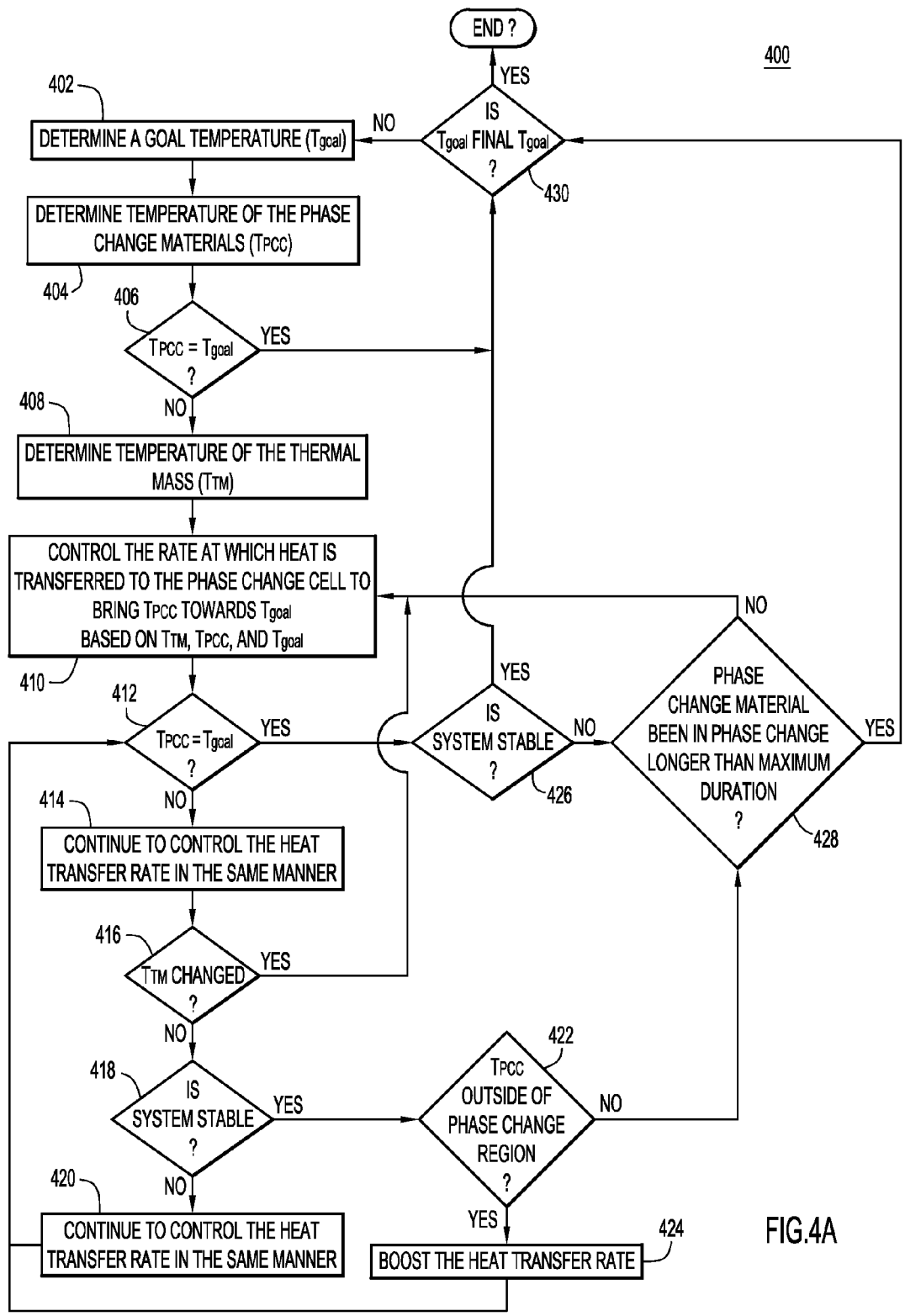
FIG. 4A is a flow chart illustrating a method of controlling the transfer of thermal energy within the calibration and control system in order to control when and how phase change materials included in the system are moved through a phase change, according to an example embodiment of the present invention.
Figure 4B:
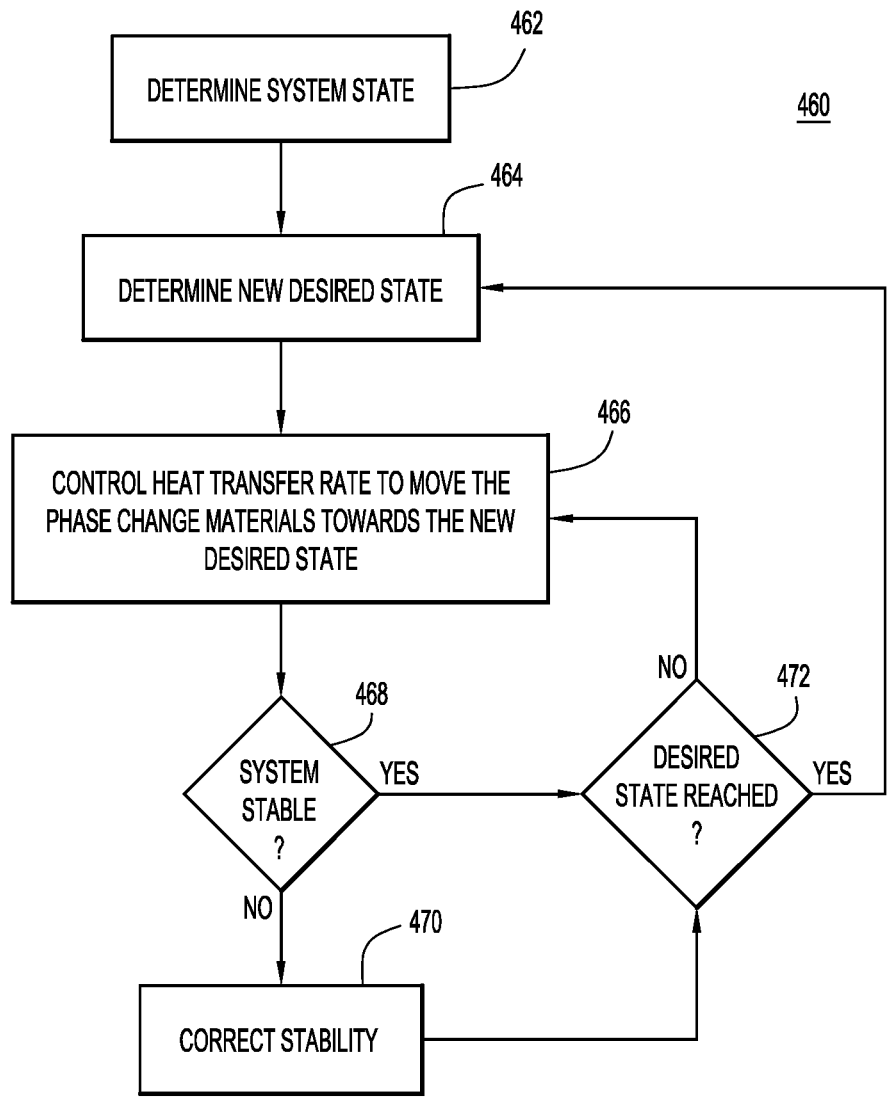
FIG. 4B is a flow chart illustrating another method of controlling the transfer of thermal energy within the calibration and control system in order to control when and how phase change materials included in the system are moved through a phase change, according to an example embodiment of the present invention.

Reference is now made to FIGS. 4A and 4B for a description of methods for controlling heat transfer at the heat transfer device 150. Generally, control of the heat transfer device 150 is dependent on the response of the system 100 to energy being transferred between the heat transfer device 150 and the PCC 110; however, the control may also adapt to changing or transient thermal mass 130 temperatures, as well as any system state knowledge gleaned from the PCC 110. Controlling the heat transfer device 150 based on these inputs may allow the heat transfer device 150 to thermally control the PCC 110 and/or the thermal mass 130. More specifically, FIG. 4A is a flow chart 400 depicting how the heat transfer device 150 is controlled (e.g., by heat transfer module 162) based on temperatures in the system (e.g., determined by monitoring module 160) in order to reach goal temperatures, according to one example embodiment. Meanwhile, FIG. 4B is a flow chart 460 depicting an embodiment where the heat transfer device 150 is controlled (e.g., by heat transfer module 162) based on the state of the phase change materials (e.g. determined by monitoring module 160). However, these two embodiments are merely examples and, in other embodiments, the heat transfer device 150 may be controlled based on a combination of temperature and state inputs (e.g., a combination of FIGS. 4A and 4B).

In FIG. 4A, initially, at step 402, a goal temperature (T goal) is determined or selected. As described with respect to FIG. 3, the goal temperatures may correlate to a portion of the full freeze and melt sequence for the phase change materials 112 in the PCC 110 and are typically set at a point above or below the desired phase change process in order to account for any sensitivity in the system. For example, if the system is in a melt cycle, the phase change materials 112 have a melt point of 20° C., and the system's sensitivity is on the order of 0.1° C., then the goal temperature is set sufficiently above the system's sensitivity to ensure that enough energy is provided for the melt process to occur. However, the goal temperature is also set close enough to a phase change temperature to ensure that the phase change materials 112 remain in the phase change for a sufficient duration. For example, the melt temperature may be set close enough to the melt point to provide a melt duration time that allows a predetermined number of temperature samples, such as 600, to be taken during the melt. The phase change duration is determined by the energy transfer rate over time and the energy transfer rate over time is determined by the difference between the goal temperature and the phase change temperature of the material 112. If the goal temperature is set at a temperature above the phase change point of the material, then the phase change process will occur before the system reaches its equilibrium.

In embodiments where a current is applied to the heat transfer device 150 in order to generate a rate of heat transfer, such as embodiments where the heat transfer device 150 is a TEC, the goal temperature will be used to calculate a current for that goal temperature. In order to determine the current, a table that specifies predefined current values for various goal temperatures and thermal mass 130 temperatures can be utilized.

At step 404, the temperature of the phase change materials 112 ($T_{PCC}$) is determined, so that at step 406, the temperature of the phase change materials 112 can be compared to the goal temperature determined at step 402. If at step 406, it is determined that the phase change materials 112 are already at the goal temperature, a new goal temperature can be selected at step 402, provided that the goal temperature is not determined to be the final goal temperature at step 430 (e.g., the final goal in a goal temperature table for a specific melting cycle). If the temperature of the phase change materials 112 is not currently at the goal temperature, then the temperature of the thermal mass 130 ($T_{TM}$) can be determined at step 408. As mentioned, in some embodiments, the temperatures of the phase change materials 112 and the thermal mass 130 may be converted from resistance readings, such that the determinations made at steps 404 and 408 include taking a resistance reading and converting the resistance reading to a temperature. However, in other embodiments, the determinations made at steps 404 and 408 may simply include retrieving a temperature measurement. Regardless of whether the temperature readings are determined by converting resistance or retrieved, if the thermal sensors 120 or 132 include multiple sensors, the temperature of the phase change materials 112 and the temperature of the thermal mass may be determined by averaging all of the thermal sensors for that particular component. For example, if the thermal mass 130 includes three PRTs, the temperature of the thermal mass 130 determined at step 480 may an average of the three temperature readings provided by the PRTs.

Figure 5:
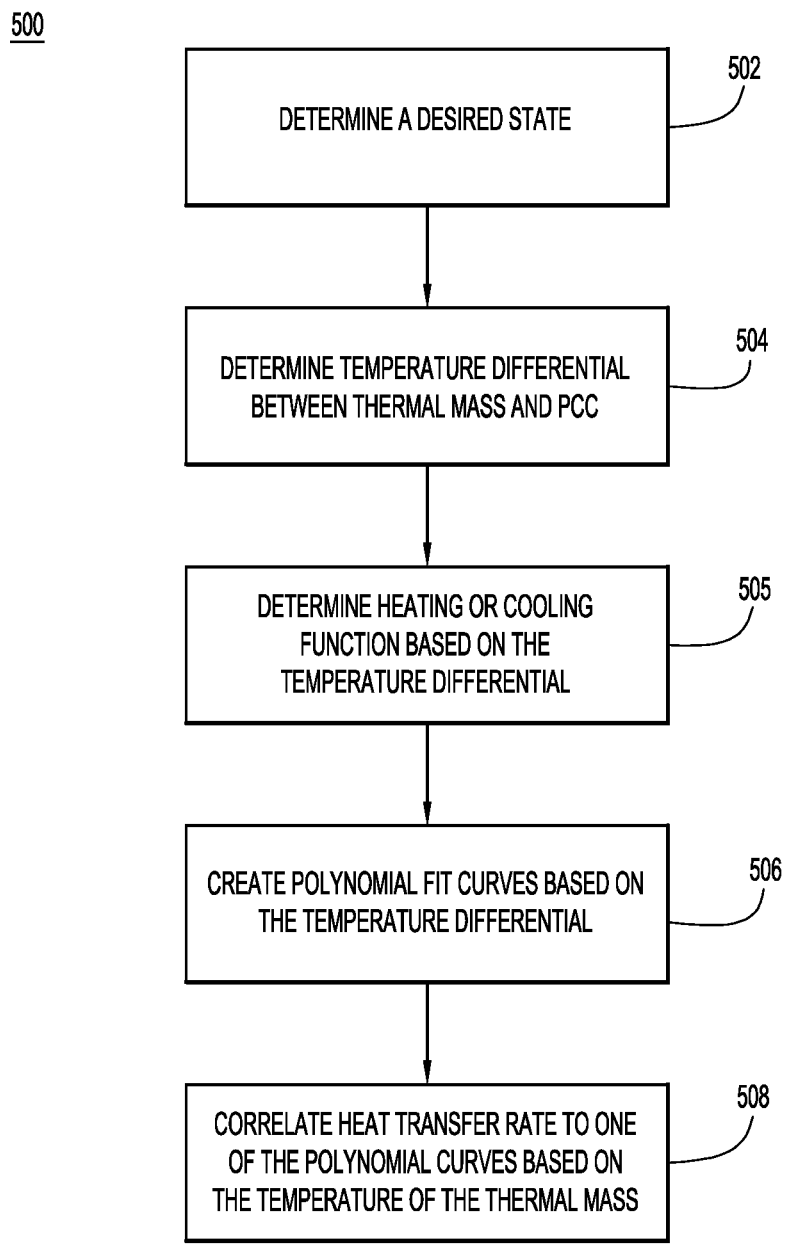
FIG. 5 is a flow chart illustrating a method of controlling heat transfer rate within the calibration and control system, according to the present invention.

At step 410, the rate at which is heat is transferred to the PCC 110 (and, thus, to the phase change materials 112) is controlled by the heat transfer device 150. The heat transfer device 150 may act in a cooling or heating capacity, depending on the temperatures of the thermal mass 130 and the phase change cell 110 and/or the temperature differential between the thermal mass 130 and the PCC 110. Moreover, the heat transfer device 150 may control the transfer of thermal energy according to a polynomial fit curve, such as a fifth-order polynomial fit curve, which may also be referred to as a thermal transfer function. The determination and control of the heat transfer rate is described in further detail below with regards to FIG. 5.

As or after the rate of heat transfer through the heat transfer device 150 is controlled at step 410 (e.g., selecting an initial thermal transfer function), the temperature of the phase change materials 112 and thermal mass 130 is continually monitored (i.e, by the monitoring module 160) in order to provide feedback for the heat transfer device 150 (e.g., the heat transfer module 162). More specifically, at step 412, the temperature of the phase change materials 112 (as measured by thermal sensor 120) is again compared to the goal temperature that was selected at step 402. Generally, as the heat transfer device 150 continues to control the heat transfer rate, the temperature of the PCC 110 is expected to move towards to the goal temperature. The goal temperature is expected to be reached by the phase change cell 110 when the system reaches thermal equilibrium at the specified heat transfer rate. For example, when the heat transfer device 150 is a TEC, the goal temperature is expected to be reached as the system reaches thermal equilibrium for a particular current or voltage.

If the phase change materials 112 have reached the goal temperature at step 412, the system can be checked for stability at step 426, as is described in further detail below with regards to FIG. 6. However, if the phase change materials 112 have not yet reached the goal temperature at step 412, the heat transfer device 150 continues to control the heat transfer rate, at step 414, in the same manner as it was controlled in step 410. For example, the heat transfer device 150 continues to transfer thermal energy in accordance with rates defined by the polynomial fit curve used at step 410. In other words, the thermal transfer function is held in place.

Generally, the hold at step 414 should be long enough so that the multiple samples can be obtained and a temperature trend can be established, either a trend or plateau. More specifically, the hold should be long enough to measure the rate of thermal propagation of the measurement limit. Thus, if the measurement limit is 1 mK, then the hold function should be at least long enough to measure a temperature change of 1 mK at the thermal sensors 120 included on the PCC 110. More specifically, since the temperature change rate minimum is 1 mK over 1 second, the hold function should be held long enough to record at least 1 second of data. However, the hold should also be shorter than the minimum time for thermal stabilization, as determined by testing a specific climate system and a thermal variation cycle time related to an orbital thermal variation condition.

At step, 416, the temperature of the thermal mass 130 is checked to determine whether the temperature of the thermal mass 130 has changed. If the temperature has changed, a new heat transfer rate is selected at step 410 since a new heat transfer rate will be needed in order to maintain or approach the same goal temperature. If, instead, the temperature remains unchanged, the system 100 may be checked for stability at step 418, which is described in further detail below with regards to FIG. 6. If the system is stable, the temperature of the PCC 110 is checked, at step 422, to determine whether the temperature of the phase change materials 112 is outside the phase change region. If not, the system may continue to control the transfer rate at step 420 in the same manner as initially controlled step 410. In other words, the thermal transfer function may be held in place at step 420 in the same manner as is described above with respect to step 414. Additionally or alternatively, in some embodiments, if the system is determined to be unstable, the energy balance of the system may be controlled in order to stabilize the system before proceeding with a heat transfer function (e.g., at step 414, 420, and/or 424). An example of stabilization is shown in the embodiment illustrated in FIG. 4B.

When the temperature of the PCC 110 is determined to be outside of the phase change region at step 422, the heat transfer rate can be boosted at step 424. For example, in some instances, the temperature goal may be just above a phase change point, but the applied energy from the heat transfer device 150 may not be sufficient to drive the phase change material 112 through a phase change. Additionally or alternatively, the boost may be required to avoid any stalls that may occur due to the thermal transfer function approaching a phase change point slowly (e.g., in order to mitigate transient gradients in the system), the heat transfer failing to match the specified goal, or any other variations and/or measurement uncertainties in the system.

Regardless of why the boost is applied, the boost increases the transferred energy to the heat transfer device 150 (thereby decreasing the cooling or increasing the heating of the phase change cell 110) so that it is able to supply enough energy to move the phase change material 112 through the phase change and/or to a goal temperature that is sufficiently above the phase change temperature in all possible conditions (including end of life and expected max out of calibration). The boost increases the amount of thermal energy transferred by the heat transfer device 150 (e.g., by increasing the amount of current supplied to a TEC acting as heat transfer device 150), in small increments during the phase change cycle and the approach to the phase change region. Consequently, if the system 100 reaches a stable or thermal equilibrium point outside of a predefined range of heat transfer, then the rate will be incrementally boosted until it enters the range and reaches the phase change point and equilibrium. However, in some embodiments, the boost may be limited, so that the boost will have a maximum value that it can add to the heat transfer rate set by the goal temperature.

Generally, when the thermal transfer function applied at step 410 is held at steps 414 and/or 420, the current goal temperature is held until the system reaches a thermal equilibrium or the time it is held exceeds a specified phase change limit duration that should obtained from testing (as is determined at step 428). The phase change limit duration may also depend on testing of the hardware included in the climate system, as different systems may have different time constants and sensitivity based on control hardware included therein and system thermal characteristics. In some embodiments, additional intelligence can be added into the hold function so that the algorithm is not continuously cycling to check various states. For example, a pre-stability check could be added that requires the standard deviation of the values to drop below a certain range or for the trend of the standard deviation to reach a certain point before the hold function releases.

Once the phase change materials 112 reach a temperature goal (as determined at step 412 or step 406) and the system is stable or the phase change materials have been in a phase change longer than a maximum duration, as determined at step 426 or 428, respectively, a new temperature value can be obtained at step 402 provided that the goal temperature was not determined to be the final goal temperature at step 430. Then, the cycle illustrated in flow chart 400 can be continued until the reached goal temperature is the final goal temperature (e.g., the system 100 may move through flow chart 400 for each goal temperature included in a goal temperature table). After the goal temperature set for the final phase change material is obtained the sequence should stop and the heat transfer device 150 should return to an off condition that allows the system 100 to return to a thermal equilibrium. Additionally or alternatively, the system 100 may move into another cycle.

Now referring to FIG. 4B for a description of another example embodiment of a method 460 for controlling the heat transfer device 150. In this embodiment, initially the system state is determined at step 462 through control feedback. The system state may include both the state of the phase change materials (e.g. solid, gas, or in phase transition) and the cycle or segment that the system is currently in (e.g., a melt cycle, a freeze cycle, etc.). In some embodiments, the system state information may be determined based on knowledge of previous cycles and/or temperature inputs received from a thermal sensor on the phase change materials 112. Regardless, once system state information is determined, a new desired state (e.g., a goal state) may be determined at step 464. In some embodiments, the goal state may be determined by referencing a goal table, similar to how a goal temperature is selected in the method of FIG. 4A; however, in other embodiments a new desired state may be determined in any desirable manner.

Once the desired state is determined, the heat transfer rate is controlled to move the phase change materials towards the desired state. Similar to step 410 from FIG. 4A, the heat transfer device 150 may be controlled in any desirable manner, such as a similar manner which is described in more detail below with regards to FIG. 5. However, in this embodiment, the heat transfer rate may be determined independent of the temperature differential between the thermal mass 130 and the PCC 110 and, instead, polynomial fit curves may be created based on feedback of the state of the phase change materials. For example, in order to determine when a material is in a phase change state, the temperature of the phase change materials may be compared to an ideal response. The ideal response may be a theoretical expected response of the phase change materials to the heat transfer rate, as determined based on ideal calculations performed utilizing predetermined conditions of the system, such as the thermal resistance of the system).

Throughout the heating process applied at step 466, the system may continue to check stability at step 468 until the new desired state has been reached (as desired as step 472).

If the system remains stable until the phase change materials reach the new desired state, a new desired state may be selected at step 464 and the process may be repeated until desired. For example, the system may move a first material through ten phase change processes, and then move a second material through three phase change processes before ending a calibration cycle. If the system becomes unstable during this process, the instability may be corrected at step 470 by controlling an energy balance within the system. In some embodiments, a determination of instability may be made if the temperature of the phase change is outside a predetermined threshold (e.g., beyond a certain standard deviation); however, in other embodiments, the stability determinations may be made in any manner, such as the manners described in further detail below with regards to FIG. 6. Now referring to FIG. 5, a flow chart 500 depicting a method of controlling the heat transfer rate (e.g., by heat transfer module 162 at step 410) is illustrated. As mentioned, the heat transfer device 150 may act in a cooling or heating capacity, depending on the temperatures of the thermal mass 130 and the phase change cell 110. Consequently, at step 502 the system determines a desired state. For example, it may be determined that the phase change materials 112 should be moved into a certain phase change state or that the thermal mass 130 should be driven towards a particular temperature state.

At step 504, the temperature differential between the PCC 110 and the thermal mass 130 is determined. Based on the temperature differential, a determination can be made, at step 505, as to whether the heat transfer device 150 should provide a heating or cooling function. For example, in embodiments where the heat transfer device 150 is a TEC, current or voltage may be applied to the heat transfer device 150 in different directions in order to switch the heat transfer device 150 between heating and cooling. In accordance with the thermoelectric phenomena, the TEC creates a temperature differential when a current or voltage is passed through a thermocouple included in the TEC, such that a heating or cooling effect is produced depending on the direction of current. This ability to heat or cool is known as the Peltier effect.

Regardless of how the heat transfer device 150 is switched between heating and cooling modes, in some embodiments, the mode determination is non-intuitive. For example, the heat transfer device 150 is used in a cooling mode when the thermal mass 130 is at temperature greater than the phase change point of the phase change materials 112 included in the PCC 110 in order to dampen the overall heat transfer rate between the thermal mass 130 and the PCC 110. More specifically, since heat may be transferred at an uncontrolled rate via mounting 140 (e.g., via paths 142), the rate of heat transfer from the thermal mass 130 to the PCC 110 is dampened by the heat transfer device 130 (acting in cooling mode) so that the duration of the phase change process can be controlled.

The heating or cooling function determined at step 505 indicates the rate of thermal energy to be delivered to the heat transfer device 150. The rate of thermal energy transfer can be determined based on the difference in temperature between the desired or goal temperature and the temperature at the thermal mass 130 and the base of the PCC 110, which are the two surfaces in contact with the heat transfer device 150. In some embodiments, the rate is determined as a function, such that a specific heating or cooling pattern is applied to the phase change materials 112. For example, in embodiments where the heat transfer device 150 is a TEC, the required heating direction (e.g., heating or cooling) and amount of heating can be determined by correlating the temperature difference between the phase change materials 112 and the goal temperature to a current amount and direction. As mentioned, if the thermal mass 130 is warmer than the PCC 110, the heat transfer device 150 will be used in the cooling mode in order to slow the heat transfer rate to the PCC 110, rather than increasing it by running in heating mode.

Moreover, based on the detected temperature differential between the thermal mass 130 and the PCC 110, polynomial fit curves may be created at step 506. The polynomial fit curves may be correlated to energy transfer rates for the phase change process of one or more materials at step 508, such that the heat transfer rate is a time dependent rate. Correlating the heat transfer to a polynomial fit curve allows the rate of temperature to be controlled in a manner that minimizes variations in transient thermal gradients as the temperature of the PCC 110 approaches a temperature associated with a phase change. Thermal gradients might cause the duration and stability of a phase change process to be altered and, thus, controlling the heat transfer rate in this manner stabilizes the system. However, in order to provide this level of temperature control, temperature gradients and responses must be constantly monitored, as is described with regards to FIG. 4A.

Since each unique system 100 may have a slightly different thermal resistance through the heat transfer device 150 and mounting 140 to the thermal mass, the polynomial curves may need to be created (at step 506) via individual testing of a system 100. The testing may provide thermal characterization of each of the components of the system 100 (e.g., reveal the exact thermal resistance through the heat transfer device 150) and generate a polynomial fit curve that relates the steady-state temperature achieved by a given heat transfer device 150 setting (e.g., a current (or voltage) for a TEC) based on various thermal mass 130 temperatures. In some embodiments, the set of curves can be approximated by a linear offset between $5^{th}$ order polynomial fit curves, wherein the offset is based on the temperature of the thermal mass 130. Moreover, in some embodiments, this relationship can be inversed to provide a setting for the heat transfer device 150 (e.g., a current or voltage) versus an expected temperature curve or function. Alternatively, a table of settings for the heat transfer device 150 based on various thermal mass 130 temperatures can be used to obtain a setting for the heat transfer device 150 for the desired goal temperature.

Figure 6:
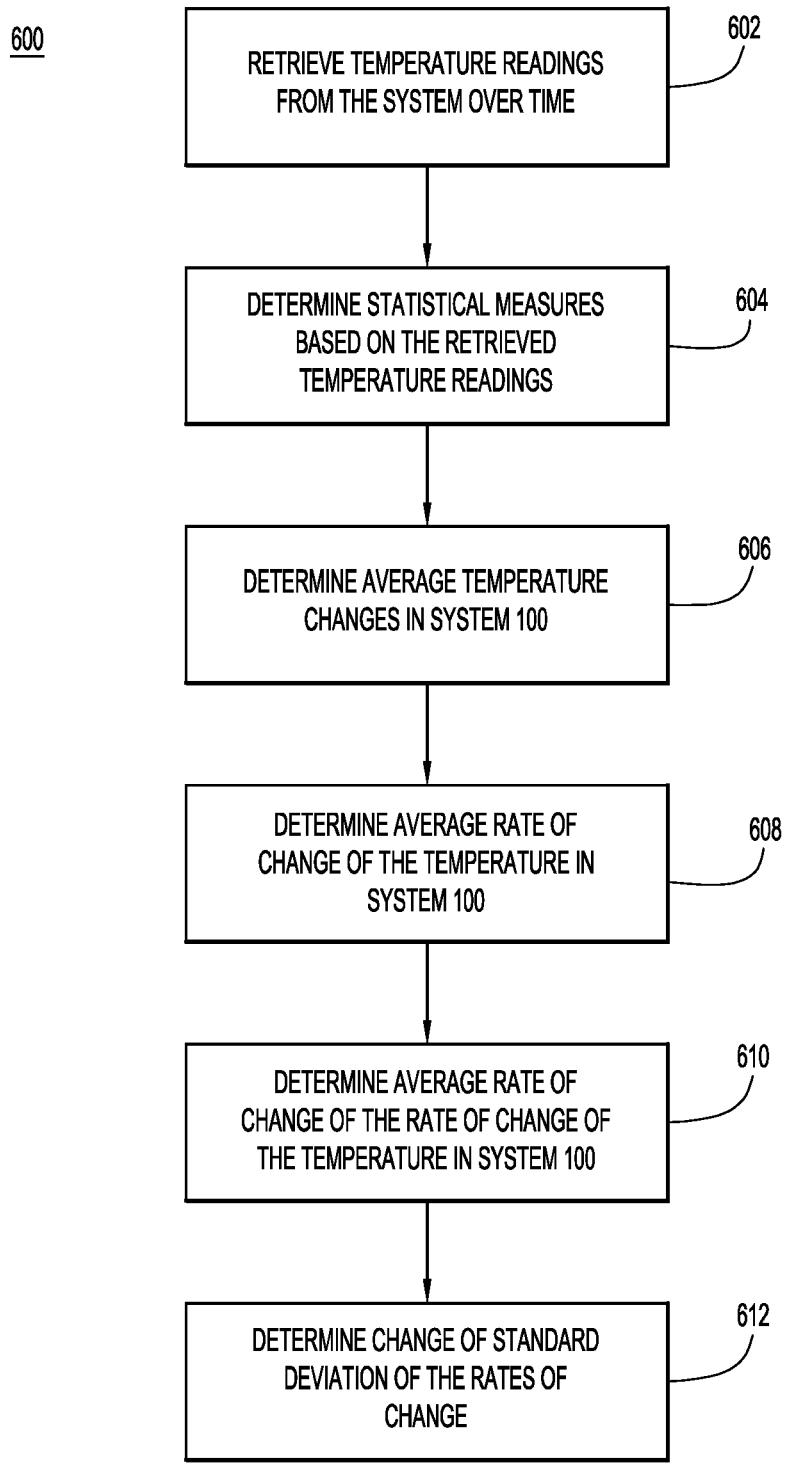
FIG. 6 is a flow chart illustrating a method of determining stability within the calibration and control system, according to the present invention.

Now referring to FIG. 6, flow chart 600 illustrates a method of determining stability of the system 100 (e.g., at steps 418 and 426, via monitoring module 160). Generally, stability indicates when the system reaches a transient state or a point of thermal equilibrium (e.g. stability), as opposed to a point of continuous thermal variation. The time for the system to reach thermal stability changes depending on the temperature of the system, the energy being applied to or by the heat transfer device 150, and the thermal characteristics of the system. Consequently, determining stability requires inputs from the thermal characterizations of the system and data from the temperature sensors 120, 132 is monitored and compared over time.

Initially, at step 602, the temperature readings provided or determined by the thermal sensors 120 on the PCC 110, the energy applied by the heat transfer device 150 over time, and/or the temperature readings provided or determined by the thermal sensors 132 on the thermal mass 130 are taken over time. Based on these readings, various statistical measures can be calculated at step 604, including averages, covariance, correlations, and sensitivity. In particular, the average, covariance, correlation, and sensitivity of the readings from thermal sensors 120 and 132 over a predetermined time can be determined (e.g., averages at thermal plateaus). These statistical measures can also be compared over periods of time, such as portions of a cycle, a predetermined time length, or a day-by-day basis.

After or as data is retrieved from the system 100 and statistical measures are calculated, the average temperature of the system 100 may be compared over time at step 606. In some embodiments, the overall average temperature may be compared over time; however, in other embodiments, the temperature of a specific component of the system 100 (e.g., the temperature of the thermal mass 130 as indicated by thermal sensors 132 and/or the temperature of the heat transfer device 150 as determined by utilizing the heat transfer device 150 as a temperature sensor) may be compared over time. In order to filter noise from the data, the temperature data is averaged over a set period of time. If the determined temperature change is within a predetermined range, it may be determined that heat addition to the system 100 has reached stability.

At steps 608 and 610, the average rate of change of the temperature (e.g., the first derivative of the temperature measurements) and the average rate of change of the rate of change of the temperature (e.g., the second derivative of the temperature measurements) are determined, respectively. The first derivative (e.g., the rate of change) indicates the stability of thermal gradients and the second derivative (e.g., the rate of change of the rate of change) indicates the stability of the change of thermal gradients. When the system has reached stability, these values are within a predetermined range that can be determined based on the uncertainty and instability of the system. If the second order derivative is positive, the system is moving towards a change in the temperature or stability and the sign of the first derivative will indicate whether the temperature is increasing or decreasing.

At step 612, the change in the standard deviation of the temperature readings from the system may be determined. The standard deviation may indicate the stability limit of the system and should be decreasing to a set value as the system stabilizes. If the first derivative of the standard deviation is positive, the system is trending out of stability; if the first derivative is negative, then the system is heading towards stability. The convergence limits and variation limits determine when the standard deviations become constant and may be determined individually for specific setups due to slight variations in different systems and sensor accuracy of the system.

The system's response during stability testing should be understood in order to determine the time over which the data may be averaged. In general the time period for these averages should be based on the sampling rate that generates a predefined confidence level of at least 68.2%.

Figure 7:
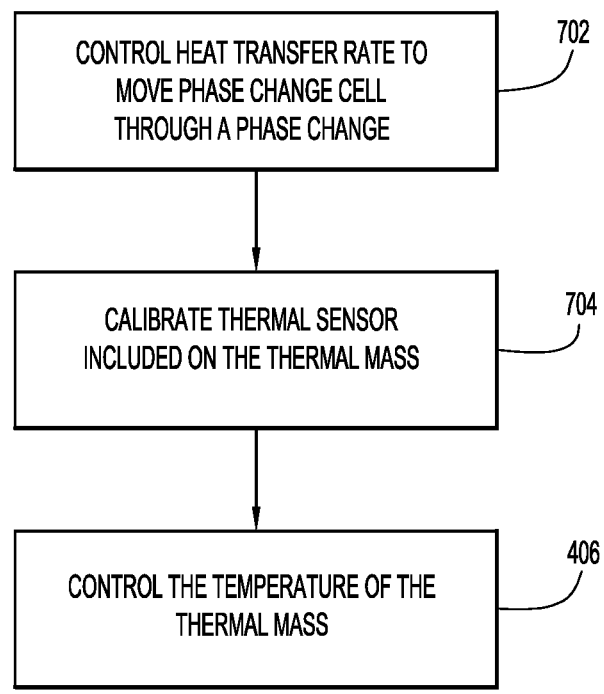
FIG. 7 is a high-level flow chart illustrating a method of controlling the system based on a phase change, according to the present invention.

Now referring to FIG. 7, a high level flow chart 700 illustrates control and calibration techniques of the system 100. Initially, at 702, the heat transfer rate is controlled to move the phase change materials 112 in the PCC 110 through a phase change. This is accomplished characterizing the relevant thermal characteristics of the control and calibration system 100 and creating drive curves (e.g., thermal transfer functions) based on the characteristics, as is described above with respect to the Figures. Driving the phase change materials 112 to a phase change enables the system to control at least the thermal mass 130 and calibrate at least the thermal sensors 132 included on the thermal mass 130. Specifically, based on the phase change, or a series of phase changes, the system 100 can calibrate sensors included on the thermal mass at step 704 and/or control the temperature of the thermal mass 130, such as by maintaining the thermal mass 130 at a predefined temperature.

Generally, the temperature sensors 132 can be recalibrated at step 704 by comparing the temperature sensor's readings to the known temperature of the phase change materials during the phase change. However, in some embodiments, the temperature sensors 132 on the thermal mass 130 may also be recalibrated in orbit based on algorithms that extract sensor drift, sensor reading correlations, thermal resistance variations, and phase change point measurements. These algorithms may utilize various measurements extracted while controlling the heat transfer device 150.

At step 706, the thermal mass 130 may be controlled based on the phase change in order to maintain the thermal mass 130 at a constant temperature. Thus, if the thermal mass 130 is a blackbody, the thermal mass 130 may be utilized to calibrate optical components of various frequencies. Alternatively, if the thermal mass 130 is or includes a laser, the laser may be maintained at a specific temperature to hold material in a transition state. For example, if the PCC 110 includes two phase change materials, the laser may be maintained at a temperature that is between the temperature at which the first material experiences a phase change and the temperature at which the second material experiences a phase change. Since solid state laser wavelength is a function of the laser temperature, maintaining this temperature may allow or ensure proper laser functionality. For example, light detection and ranging (LIDAR) and frequency modulation (FM) spectroscopy require a very precise laser wavelength to match the absorption lines (using absorption spectroscopy) of certain gases, such as carbon dioxide and oxygen that can be ensured by precisely maintaining the laser temperature. When the thermal mass 130 is controlled (e.g., maintained at a certain temperature) the system 100 may also check for stability in the same manner discussed above with regards to FIG. 6.

The techniques shown and described herein provide a number of advantages. For example, the techniques provided herein provided dynamic control of a phase change cell by providing closed loop feedback of the system, in contrast with open loop systems that only allow continuous heating or cooling. Consequently, present techniques allow for phase change material phase change duration control and phase change duration variation. Moreover, present techniques allow for various phase change profiles and durations based on different system thermal masses or boundary temperatures.

While the invention has been illustrated and described in detail and with reference to specific embodiments thereof, it is nevertheless not intended to be limited to the details shown, since it will be apparent to one skilled in the art that various modifications and structural changes may be made therein without departing from the scope of the inventions and within the scope and range of equivalents of the claims. For example, although some embodiments described herein are described in the context of a space-based system that is in or on orbit and/or in relation to calibration of temperature sensors for optical devices, the present invention is not limited to space-based or optical device applications. In addition, various features from one of the embodiments may be incorporated into another of the embodiments. For example, in different embodiments, any number and configuration of sensors 132 (as well as thermal sensors 120) may be utilized with various embodiments. Accordingly, it is appropriate that the appended claims be construed broadly and in a manner consistent with the scope of the disclosure as set forth in the following claims.

Finally, it is intended that the present invention cover the modifications and variations of this invention that come within the scope of the appended claims and their equivalents. For example, it is to be understood that terms such as "left", "right" "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration. Further, the term "exemplary" is used herein to describe an example or illustration. Any embodiment described herein as exemplary is not to be construed as a preferred or advantageous embodiment, but rather as one example or illustration of a possible embodiment of the invention.

What is claimed:

1. A calibration and control system for a climate system comprising:
   a phase change cell including an enclosure, a material sealed within the enclosure, and a first thermal sensor configured to measure a temperature of the material;
   a thermal mass including at least one second thermal sensor configured to measure a temperature of the thermal mass,
   a heat transfer device in thermal communication with the phase change cell and the thermal mass and configured to transfer energy between the phase change cell and the thermal mass at a transfer rate; and
   a processor configured to:
   control the transfer rate based on at least the temperature of the thermal mass in order to selectively move the material through a phase change with transferred energy;
   control the temperature of the thermal mass based on the phase change; and
   calibrate the at least one second thermal sensor based on the temperature of the first thermal sensor during the phase change.

2. The system of claim 1, wherein the thermal mass is an optical component, the phase change cell is contained within or attached to the optical component, and the temperature of the optical component is controlled by maintaining the material in the phase change, which occurs at a known temperature.

3. The system of claim 2, wherein the optical component comprises a laser.

4. The system of claim 3, wherein the material is a first material, the phase change cell includes a second material sealed within the enclosure, the first thermal sensor is configured to measure a first temperature for the first material and a second temperature for the second material, and the processor is further configured to:
   determine a first phase change temperature for the first material and a second phase change temperature for the second material; and
   maintain the laser at a temperature between the first phase change temperature and the second phase change temperature.

5. The system of claim 2, wherein the optical component comprises a blackbody.

6. The system of claim 1, wherein the processor is configured to control the transfer rate in order to move the material through the phase change over a predetermined duration of time.

7. The system of claim 1, wherein the processor is further configured to control the transfer rate based on the temperature of the material, such that the transfer rate is adjusted based on feedback indicating a thermal response of the material.

8. The system of claim 7, wherein, in controlling the transfer rate, the processor is further configured to:
 decrease the transfer rate when the temperature of the thermal mass is warmer than the temperature of the material;
 increase the transfer rate when the temperature of the thermal mass is cooler than the temperature of the material; and
 modulate the transfer rate to maintain stability.

9. The system of claim 8, wherein the transfer rate is increased and decreased according to one or more polynomial fit curves so that the material approaches a phase change temperature at a controlled rate.

10. The system of claim 1, wherein the processor is further configured to:
 monitor the temperature of the thermal mass and the temperature of the material to determine whether the system is stable, the system being stable when the rate of change of the temperature of the material and the rate of change of the temperature of the thermal mass are both changing at a rate below a predetermined threshold.

11. The system of claim 1, wherein the heat transfer device comprises a thermoelectric cooler and generates a temperature differential that transfers energy based on a direction of a current passing through the thermoelectric cooler.

12. The system of claim 1, further comprising:
 a mounting coupling the phase change cell to the thermal mass, wherein the heat transfer device is configured to provide a first thermal path between the phase change cell and the thermal mass, and the mounting provides at least one second thermal path between the phase change cell and the thermal mass that is an uncontrolled thermal path.

13. The system of claim 1, wherein the first thermal sensor comprises at least one of a thermistor, a thermocouple, and a temperature measuring diode.

14. A method of controlling and calibrating a climate system comprising:
 controlling the rate of energy transfer from a heat transfer device to a phase change cell in order to selectively move a material included in the phase change cell through a phase change with the energy, wherein a temperature of a thermal mass in the climate system is controllable when the material is maintained in the phase change, and wherein the rate of energy transfer is based on at least:
  a temperature of the thermal mass that is coupled to the phase change cell, the temperature being provided by a thermal sensor included in the thermal mass; and
  a temperature of the material; and
 calibrating the thermal sensor based on the temperature of the material during a predetermined portion of the phase change.

15. The method of claim 14, wherein the rate of energy transfer causes the material to move through the phase change over a predetermined duration of time and controlling the transfer rate further comprises:
 decreasing the rate of energy transfer when the temperature of the thermal mass is warmer than the temperature of the material; and
 increasing the rate of energy transfer when the temperature of the thermal mass is cooler than the temperature of the material, wherein the transfer rate is increased and decreased according to one or more polynomial fit curves so that the material approaches a phase change temperature point at a controlled rate.

16. The method of claim 14, further comprising:
 monitoring the temperature of the thermal mass and the temperature of the material; and
 determining that stability exists when the rate of change of the temperature of the material and the rate of change of the temperature of the thermal mass are both changing at a rate below a predetermined threshold.

17. The method of claim 14, wherein controlling the rate of energy transfer further comprises:
 controlling the rate of energy transfer with a set of linearly offset thermal transfer functions to cycle the material through a predetermined list of temperatures.

18. The method of claim 15, wherein controlling the rate of energy transfer further comprises:
 maintaining one of the thermal transfer functions for a duration that allows predetermined number of temperature samples to be obtained from the material.

19. A control and calibration apparatus for a climate system comprising:
 a phase change cell including an enclosure, a material sealed within the enclosure, and a thermal sensor configured to measure a temperature of the material;
 a thermal mass; and a heat transfer device in thermal communication with the phase change cell and the thermal mass and configured to transfer energy between the phase change cell and the thermal mass at a transfer rate in order to control the temperature of the thermal mass and selectively move the material through a phase change with the transferred energy, the transfer rate being based on at least state knowledge of the material, wherein a temperature of the thermal mass is controllable when the material is maintained in the phase change.

20. The apparatus of claim 19, wherein the thermal sensor is a first thermal sensor, the thermal mass includes at least one second thermal sensor configured to measure a temperature of the thermal mass, the transfer rate is further based on a temperature differential between the first thermal sensor and the at least one second thermal sensor, such that the transfer rate is adjusted based on feedback indicating a thermal response of the material.

21. The apparatus of claim 20, wherein the at least one second thermal sensor is configured to be calibrated based on the temperature of the first thermal sensor during a predetermined portion of the phase change.

22. The apparatus of claim 19, wherein the transfer rate is further controlled based on a comparison of the state knowledge to an ideal response of the material.

23. The apparatus of claim 19, wherein the transfer rate is further controlled based on a stability of the apparatus.

* * * * *